United States Patent [19]

Pabla et al.

[11] Patent Number: 5,677,671

[45] Date of Patent: Oct. 14, 1997

[54] CIRCUIT FOR INTERFACING BRAKE, TURN, AND HAZARD WARNING SIGNALS WITH ENGINE ECM

[75] Inventors: Parmjit S. Pabla, Fort Wayne; Merrill D. Miller, Huntington, both of Ind.

[73] Assignee: Navistar International Transportation Corp., Chicago, Ill.

[21] Appl. No.: 692,004

[22] Filed: Jun. 26, 1996

[51] Int. Cl.$^6$ ............................................. B60Q 1/44
[52] U.S. Cl. ........................ 340/479; 340/431; 340/464; 340/465; 340/468; 340/471; 340/475; 307/10.8; 188/1.11
[58] Field of Search .............................. 340/463–465, 340/468, 471, 475, 479, 431; 307/10.8; 280/DIG. 14; 188/1.11

[56] References Cited

U.S. PATENT DOCUMENTS 5,121,723  6/1992  Stepper et al. .................... 123/322
5,343,780  9/1994  McDaniel et al. ................. 180/179
5,585,784  12/1996  Pabla et al. ...................... 340/479

OTHER PUBLICATIONS

"Electrical Circuit Diagrams" Manual No. CTS–5122S (Jan. 1995) Navistar International Transportation Corp., 1994, pp. 30, 95, 196.

Primary Examiner—Jeffery Hofsass
Assistant Examiner—Daniel J. Wu
Attorney, Agent, or Firm—Dennis K. Sullivan

[57] ABSTRACT

A circuit for the electrical system of an automotive vehicle, such as a truck, interfaces a brake switch, a combination turn signal/hazard warning signal switch, and an engine electronic control module (ECM) that has two separate brake signal inputs. The circuit is especially useful when the vehicle engine has a power take-off (PTO) to prevent unintended interruption of power flow through the PTO to an accessory device, such as a salt spreader, hydraulic pump, air compressor, etc. The circuit can be fabricated from conventional circuit components. A pre-existing vehicle can be retrofitted with the circuit by a jumper harness.

17 Claims, 2 Drawing Sheets

CIRCUIT FOR INTERFACING BRAKE, TURN, AND HAZARD WARNING SIGNALS WITH ENGINE ECM

FIELD OF THE INVENTION

This invention relates generally to automotive vehicle electrical circuits, and more particularly to a circuit interfacing a brake switch and a combination turn signal/hazard warning signal switch with an engine electronic control module (ECM). The inventive circuit is especially useful in a vehicle whose engine has a power take-off (PTO) for operating one or more accessory devices such as a salt spreader, hydraulic pump, etc., and whose ECM has two brake signal inputs, one of which is the logic complement of the other.

BACKGROUND AND SUMMARY OF THE INVENTION

A known truck signaling system comprises a combination turn signal/hazard warning signal switch that can be selectively operated by the driver (operator) of the vehicle to signal a right turn, to signal a left turn, or to signal a hazard warning. A common flasher is used to flash the appropriate lamps of the truck for each of the three respective signals, and it is connected in a feed to a hazard warning input terminal of the combination turn signal/hazard warning signal switch. The combination turn signal/hazard warning signal switch also has a brake (stop) input terminal to which a feed from a normally open brake (stop) switch is connected. Brake application that is concurrent with non-actuation of the combination turn signal/hazard warning signal switch will cause the rear brake (stop) lamps on both right and left sides of the vehicle to illuminate while front signal lamps that signal turn and/or hazard warning remain off. Actuation of the turn signal/hazard warning signal switch to signal a turn, concurrent with brake application, will cause the rear brake (stop) lamp(s) on the side of the vehicle toward the signaled direction of turning to flash intermittently while those rear lamp(s) toward the opposite side remain continuously illuminated. Actuation of the combination turn signal/hazard warning signal switch to signal a hazard warning will, in the absence of brake application, cause the rear brake (stop) lamp(s) toward both sides of the vehicle, and other lamps that signal hazard warning, to flash intermittently; however, should the brakes be concurrently applied, the rear brake lamps, and all other lamps that are signaling hazard warning, will continuously illuminate.

A known engine ECM for a truck comprises two inputs for determining if the brakes are being applied by the driver. One input is sometimes referred to as "brake normally open" input, and the other, as "brake normally closed" input. These two inputs are intended to receive respective binary logic level signals, which are supplied from a D.C. voltage source (typically the vehicle electrical power supply) via a normally open switch and via a normally closed switch (which may be a relay) respectively. When the vehicle is being operated and the brakes are not being applied, the "brake normally open" input receives no voltage (corresponding to low logic level), while the "brake normally closed" input receives live D.C. voltage (corresponding to high logic level). When the vehicle is being operated and the brakes are being applied, the "brake normally open" input receives live D.C. voltage, while the "brake normally closed" input receives no voltage.

Certain trucks are equipped with a PTO that is operatively coupled to the engine for powering certain accessory devices, such as those mentioned above. An accessory device is typically disconnectably coupled to the engine via the PTO, and when disconnection occurs, the power flow through the PTO to the accessory device is interrupted. Disconnection can occur when certain operating conditions are detected. For example, a vehicle speed sensor, a gear selector switch, a stop lamp switch, and/or a clutch switch may be connected in the vehicle's electrical system to cause such disconnection upon occurrence of a certain condition and/or conditions. Equipping a vehicle having an engine ECM of the foregoing type with a PTO should assure that there is no interaction between various electrical signaling system components that results in unintended interruption of power flow through a PTO to an accessory device, and it is toward this objective that the present invention is directed.

One aspect of the present invention relates to a new and unique circuit interfacing a brake (stop) switch, a combination turn signal/hazard warning signal switch, and an engine ECM having two brake switch inputs so that no undesired electrical interactions, like spurious feedback paths for example, cause unintended interruption of power flow through a PTO to an accessory device. A presently preferred embodiment of the invention employs known system components but connects them in a new and unique cooperative association to achieve the desired objective.

The foregoing, along with further features and advantages of the invention, will be seen in the following disclosure of a presently preferred embodiment of the invention depicting the best mode contemplated at this time for carrying out the invention. The disclosure includes drawings, as now briefly described.

DESCRIPTION OF THE PREFERRED EMBODIMENT

Figure 1:
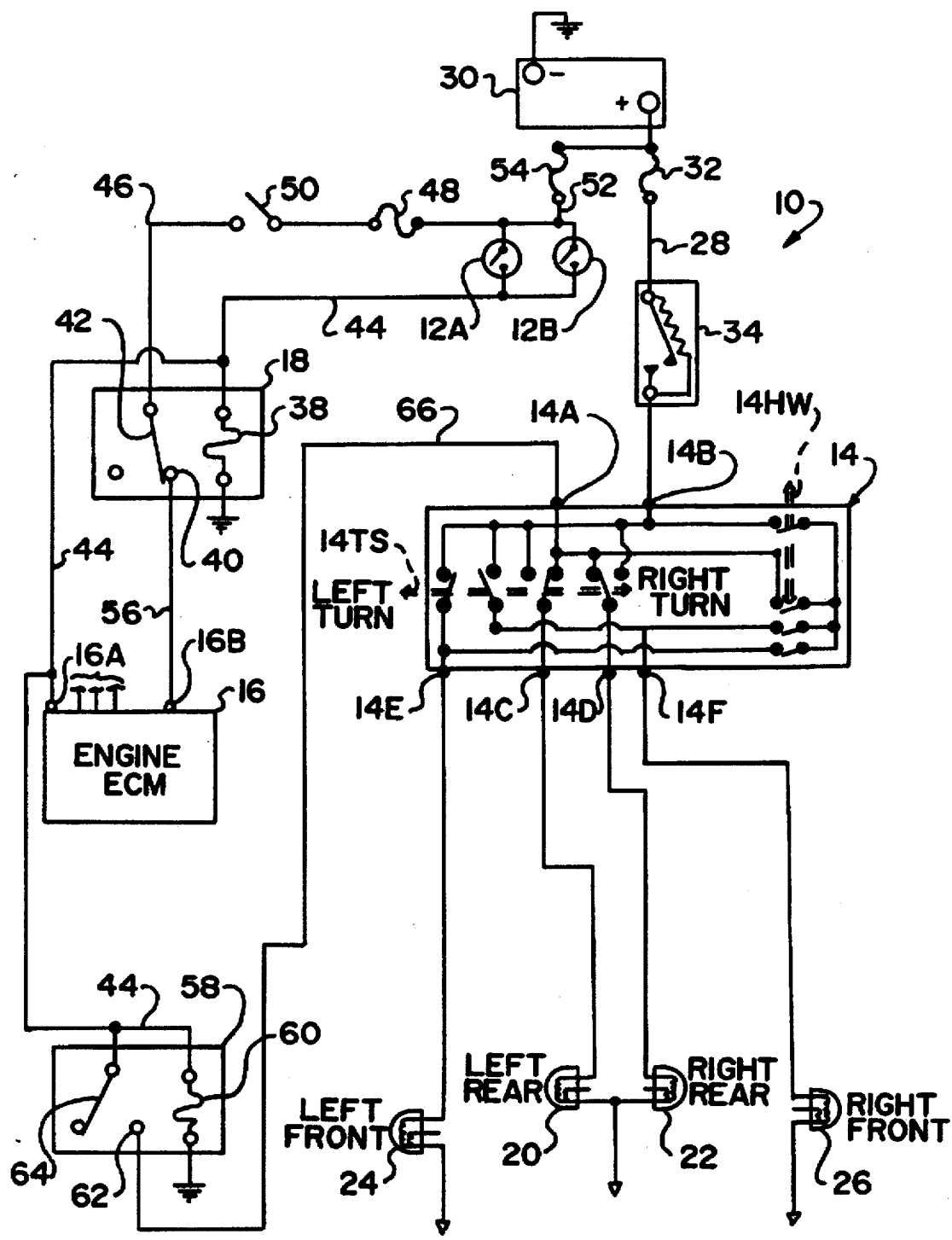
FIG. 1 is an electrical schematic diagram of relevant portions of a truck electrical system embodying principles of the present invention.

FIG. 1 shows an embodiment of the inventive circuit 10 for a brake system of an automotive vehicle that operates vehicle brakes in response to brake application by a driver (operator) of the vehicle and for a signaling system of the vehicle that gives brake application, right turn, left turn, and hazard warning signals.

Circuit 10 comprises: two (for deliberate redundancy) normally open brake (stop) switches 12A, 12B connected in parallel; a combination turn signal/hazard warning switch 14; an engine ECM 16; and an electromechanical brake (stop) switch relay 18.

Combination turn signal/hazard warning switch 14 comprises a turn signal/brake input terminal 14A, a hazard warning input terminal 14B, a left rear lamp output terminal 14C, a right rear lamp output terminal 14D, a left front lamp output terminal 14E, and a right front lamp output terminal 14F. A left rear lamp load 20 is connected to terminal 14C, a right rear lamp load 22 is connected to terminal 14D, a left front lamp load 24 is connected to terminal 14E, and a right front lamp load 26 is connected to terminal 14F.

A feed 28 connects an ungrounded terminal of the vehicle's D.C. power supply 30 to terminal 14B, and comprises, in series, an in-line current overload protection device 32 and a flasher 34.

Combination turn signal/hazard warning switch 14 further comprises a hazard warning switch portion 14HW and a turn signal switch portion 14TS. The internal construction of switch 14 provides electric continuity from terminal 14B to switch portion 14HW and to certain contacts of switch portion 14TS. The internal construction of switch 14 also provides electric continuity from terminal 14A to certain other contacts of switch portion 14TS. As will be explained in fuller detail later on, the normally open condition of switches 12A and 12B provides no voltage to terminal 14A when the brakes are not being applied, but voltage of the ungrounded terminal of power supply 30 is delivered to terminal 14A when the brakes are being applied, closing switches 12A and 12B. FIG. 1 depicts the condition where switch 14 is giving neither a hazard warning nor either turn signal.

Turn signal switch portion 14TS is selectively operable by the driver of the vehicle for giving right and left turn signals, the right turn signal being given by connecting terminals 14D and 14F to terminal 14B to cause the lamp loads 22, 26 toward the right side of the vehicle to be flashed by flasher 34, and the left turn signal being given by connecting terminals 14C and 14E to terminal 14B to cause the lamp loads 20, 24 toward the left side of the vehicle to be flashed by flasher 34. Should the brakes be applied concurrent with operation of turn signal switch portion 14TS to either right turn or left turn condition, the resulting continuous application of voltage from power supply 30 to terminal 14A is delivered via switch 14 only to the rear lamp load on the side opposite the side being flashed. Operation of hazard warning switch portion 14HW alone causes all lamp loads 20, 22, 24, 26 connected to terminals 14C, 14D, 14E, and 14F to flash, but if the brakes are applied at the same time, all of these lamp loads will continuously illuminate.

Relay 18 comprises an operating coil 38 and a set of contacts comprising a fixed contact 40 and a movable contact 42 that is operated by coil 38 to selectively establish contact with contact 40. FIG. 1 shows relay 18 in a first condition where coil 38 is not being energized, causing movable contact 42 to make contact with fixed contact 40. When coil 38 is energized, the relay operates to a second condition where movable contact 42 is moved out of contact with fixed contact 40. Thus, contacts 40 and 42 provide a controlled conductivity path through relay 18 under the control of coil 38 wherein the set of contacts is closed when the coil is not energized and open when the coil is energized. This controlled conductivity path is operable to a first conductivity condition providing circuit continuity through the engaged contacts 40, 42 when coil 38 is not being energized and to a second conductivity condition providing no circuit continuity through the disengaged contacts 40, 42 when coil 38 is being energized.

Relay 18 is in essence a switch that is slaved to switches 12A, 12B. A feed 44 connects the load side of switches 12A, 12B to one termination of coil 38 while the other coil termination is grounded. A feed 46, that includes, in series, an in-line current overload protection device 48 and a switch portion 50 of the vehicle's ignition switch, connects the ungrounded terminal of power supply 30 to movable contact 42. Switch portion 50 is closed when the ignition switch is operated to "start" and "on" positions. A feed 52 comprising a current overload protection device 54 connects the supply side of switches 12A, 12B to the ungrounded terminal of power supply 30. Closure of either normally open switch 12A, 12B is effective to energize coil 38, causing relay 18 to operate to its second condition; and when both switches 12A, 12B are open, coil 38 is deenergized, and relay 18 reverts to its first condition.

Feed 44 also connects to a "brake normally open" input 16A of engine ECM 16 to supply to that input a binary logic signal level that is high when either switch 12A, 12B is closed, and low when both switches are open. Engine ECM 16 also has a "brake normally closed" input 16B. A feed 56 connects fixed contact 40 of relay 38 to ECM input 16B. Thus, when relay 18 is in its first condition (brakes not applied so that switches 12A, 12B are both open), the continuity provided by the aforementioned controlled conductivity path through relay 18 causes voltage from power supply 30 to be delivered to input 16B of engine ECM 16 to supply that input with a high binary logic signal level. When relay 18 is in its second condition (brakes applied so that switches 12A, 12B are both closed), the continuity through the relay's controlled conductivity path is interrupted to cause no power supply voltage to be delivered to ECM input 16B thereby supplying that input with a low binary logic signal level. Therefore, feed 56 enables ECM input 16B to sense to which one of the first and second conditions relay 18 is being operated, and circuit 10 provides for the logic level signal delivered to one of the two inputs 16A, 16B to always be the complement delivered to the other. (Any overlap in the respective logic signal levels, such as may occur for a few milliseconds during switching between levels, is ignored by ECM 16, but if overlap exists for a longer time, ECM 16 indicates a fault).

Circuit 10 further comprises a second relay 58. Like relay 18, relay 58 is in essence a switch that is slaved to switches 12A, 12B. Relay 58 comprises an operating coil 60 and a set of contacts comprising a fixed contact 62 and a movable contact 64 that is operated by coil 60 to selectively establish contact with contact 62. FIG. 1 shows relay 58 in a first condition where coil 60 is not being energized, causing movable contact 64 to be out of contact with fixed contact 62. When coil 60 is energized, relay 58 operates to a second condition where movable contact 64 is moved into contact with fixed contact 62. Thus, contacts 64 and 62 form a controlled conductivity path through relay 58 under the control of coil 60 wherein the set of contacts is open when the coil is not energized and closed when the coil is energized. This controlled conductivity path is operable to a first conductivity condition providing no circuit continuity through the disengaged contacts 64, 62 when coil 60 is not being energized and to a second conductivity condition providing circuit continuity through the engaged contacts 64, 62 when coil 60 is being energized.

Feed 44 connects the load side of switches 12A, 12B to both movable contact 64 and one terminal of coil 60. The other terminal of coil 60 is grounded. Closure of either normally open switch 12A, 12B is effective to energize coil 60, causing relay 58 to operate to its second condition; and when both switches 12A, 12B are open, coil 60 is deenergized, and relay 58 reverts to its first condition.

A feed 66 connects fixed contact 62 to terminal 14A of switch 14. When relay 58 is in its first condition, the continuity through the relay's controlled conductivity path is interrupted to cause no power supply voltage to be delivered to terminal 14A. When relay 58 is in its second condition, continuity through the relay's controlled conductivity path is established to cause power supply voltage to be delivered to terminal 14A. The current path through feed 44, relay 58, and feed 66 enables a stop signal to be given by both rear lamp loads 20, 22 when no turn signal is being given by switch 14. When a turn signal is being given, the rear lamp load opposite the direction of turn being signaled is enabled to give a stop signal.

In operation, circuit 10 performs the important functions of providing complementary logic signals to inputs 16A and 16B of ECM 16, and of isolating terminal 14A from brake switches 12A, 12B whenever the brake switches are not closed. It allows the hazard warning signal to also be given at any time by turning the hazard warning switch on, but if the brakes are applied while the hazard warning switch is on, all lamps signaling hazard warning will continuously illuminate.

Figure 2:
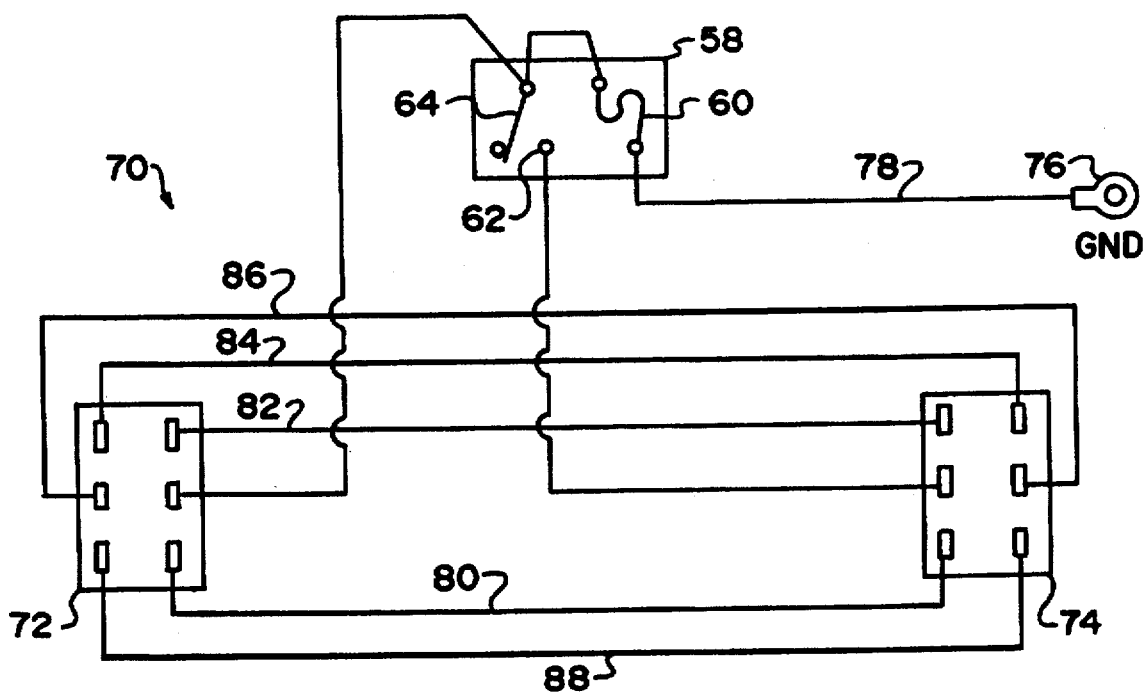
FIG. 2 is an electrical schematic diagram illustrating a jumper harness for retrofitting a pre-existing vehicle with the inventive circuit.

The inventive circuit can be constructed in accordance with the schematic diagram of FIG. 1 in a new vehicle. It is also possible to retrofit a pre-existing vehicle by means of a jumper harness 70 shown in FIG. 2. Jumper harness 70 comprises a first connector 72, a second connector 74, and a relay 58. Relay 58 is intended to be mounted in a suitable location on a vehicle, and in certain pre-existing trucks this is on the firewall that separates the cab from the engine compartment. A terminal 76 at the end of a single wire pig-tail 78 is attached to the firewall to ground one side of coil 60.

In such trucks, a six-terminal connector of a pre-existing wiring harness (not shown in FIG. 2) connects to combination turn signal/hazard warning switch 14. (FIG. 1 shows the six terminals of switch 14.) The pre-existing wiring harness provided the following direct feeds: 1) a feed from brake switches 12A, 12B to terminal 14A; 2) a feed from flasher 34 to terminal 14B; 3) a feed from terminal 14C to lamp load 20; 4) a feed from terminal 14D to lamp load 22; 5) a feed from terminal 14E to lamp load 24; and 6) a feed from terminal 14F to lamp load 26.

The pre-existing six-terminal connector is first disconnected from switch 14. Connector 72 of jumper harness 70 is connected to the just-disconnected six-terminal connector, and connector 74 of jumper harness 70 is connected to switch 14. Jumper harness 70 comprises five wires 80, 82, 84, 86, and 88, each extending between respective terminals of the two connectors 72, 74. These maintain the last five direct feeds identified at the end of the immediately preceding paragraph. The feed from brake switches 12A, 12B to terminal 14A is however provided through relay 58 in the manner depicted by FIG. 1. When the jumper harness has been installed, the circuit is schematically like that of FIG. 1 so that when relay 58 is in its first condition, the continuity through the relay's controlled conductivity path is interrupted to cause no power supply voltage to be delivered to terminal 14A, and when relay 58 is in its second condition, continuity through the relay's controlled conductivity path is established to cause power supply voltage to be delivered to terminal 14A.

While a presently preferred embodiment of the invention has been illustrated and described, it should be appreciated that principles of the invention are applicable to all embodiments that fall within the scope of the following claims.

What is claimed is:

1. An electric circuit for an automotive vehicle that has brakes which are applied and released by an operator of the vehicle, a signaling system that includes brake switch means for giving a brake signal, a turn signal switch for giving right and left turn signals, and a hazard warning switch for giving a hazard warning signal, and an engine electronic control module that has first and second input terminals for receiving brake signals, said circuit comprising:

an engine electronic control module comprising first and second inputs for receiving brake signals;

a signaling system that gives brake application, right turn, left turn, and hazard warning signals; brake switch means that serves both said electronic control module and said signaling system and that is selectively operable to give respective brake non-application and brake application signals;

a first feed from said brake switch means to said first input of said electronic control module for enabling said first input of said electronic control module to sense which one of said brake application and brake non-application signals is being given by said brake switch means;

slave switch means slaved to said brake switch means to be selectively operable to first and second switch conditions corresponding respectively to said brake switch means giving a brake non-application signal and a brake application signal respectively, said slave switch means comprising first and second controlled conductivity paths each of which is selectively operable to respective first and second conductivity conditions corresponding respectively to the first and second switch conditions of said slave switch means respectively;

a second feed from said first controlled conductivity path of said slave switch means to said second input of said electronic control module for enabling said second input of said electronic control module to sense to which one of said first and second switch conditions said slave switch means is being operated; and a third feed from said second controlled conductivity path of said slave switch means to said signaling system that, when said slave switch means is operated to its second switch condition, provides circuit continuity from said brake switch means to said signaling system for enabling said signaling system to give a stop signal, and that, when said slave switch means is operated to its first switch condition, provides no circuit continuity from said brake switch means to said signaling system.

2. An electric circuit as set forth in claim 1 in which said slave switch means comprises electromechanical relay means having coil means via which the relay means is slaved to said brake switch means, a first set of contacts operated by said coil means, and a second set of contacts operated by said coil means, said first set of contacts providing said first controlled conductivity path of said slave switch means, and said second set of contacts providing said second controlled conductivity path of said slave switch means.

3. An electric circuit as set forth in claim 2 in which, when said brake switch means is giving a brake non-application signal, said first set of contacts is operated closed and said second set of contacts is operated open, and when said brake switch means is giving a brake application signal, said first set of contacts is operated open and said second set of contacts is operated closed.

4. An electric circuit as set forth in claim 3 in which said relay means comprises first and second individual relays each having its own coil, said first set of contacts is contained in said first relay and operated by its coil, and said second set of contacts is contained in said second relay and operated by its coil.

5. An electric circuit as set forth in claim 4 in which the coils of both said first and second relays are connected to said brake switch means to be simultaneously energized when said brake switch means is giving a brake application signal, and to be simultaneously de-energized when said brake switch means is giving a brake non-application signal.

6. An electric circuit as set forth in claim 2 in which said relay means comprises first and second individual relays each having its own coil, said first set of contacts is contained in said first relay and operated by its coil, and said second set of contacts is contained in said second relay and operated by its coil.

7. An electric circuit as set forth in claim 6 in which said brake switch means is selectively operable to an open condition to give a brake non-application signal when the brakes are not being applied, and to a closed condition to give a brake application signal when the brakes are being applied.

8. An electric circuit as set forth in claim 7 in which the coils of both said first and second relays are connected to said brake switch means to be simultaneously energized when said brake switch means is in closed condition, and to be simultaneously deenergized when said brake switch means is in open condition.

9. An electric circuit as set forth in claim 1 in which said signaling system comprises a combination turn signal/ hazard warning switch that is selectively operable by a vehicle operator for giving right turn, left turn, and hazard warning signals, said combination turn signal/hazard warning switch comprising a turn signal/brake input terminal and a hazard warning input terminal, said third feed connects to said turn signal/brake input terminal, and further including a fourth feed for feeding live D.C. voltage to said hazard warning input terminal, said fourth feed comprising a flasher.

10. An electric circuit as set forth in claim 9 in which said slave switch means comprises an electromechanical relay having a selectively energizable coil, a set of contacts operated by said coil for selectively operating said second controlled conductivity path to its first and second conductivity conditions.

11. An electric circuit as set forth in claim 10 in which said brake switch means is selectively operable to an open condition to give a brake non-application signal when the brakes are not being applied, and to a closed condition to give a brake application signal when the brakes are being applied, said coil is energized when said brake switch means is in closed condition and deenergized when said brake switch means is in open condition, and said set of contacts is closed when said coil is energized and open when said coil is not energized.

12. An electric circuit as set forth in claim 10 in which said relay is contained in a jumper harness connected to said combination turn signal/hazard warning signal switch.

13. An electric circuit as set forth in claim 12 in which said jumper harness comprises two connectors containing respective terminals, five single wire conductors, each between a respective terminal of one connector and a corresponding terminal of the other connector, and said set of contacts are connected in circuit between a further terminal of said one connector and a corresponding terminal of said other connector.

14. An electric circuit as set forth in claim 1 in which said brake switch means provides to said first input of said electronic control module, via said first feed, a first binary logic signal having respective binary logic levels corresponding to the brake non-application signal and the brake application signal respectively, said slave switch means provides to said second input of said electronic control module, via said second feed, a second binary logic signal having respective binary logic levels corresponding to the first and second switch conditions of said slave switch means, and the binary logic level of said first binary logic signal is opposite the binary logic level of said second binary logic signal when said slave switch means is in its first switch condition and is opposite the binary logic level of said second binary logic signal when said slave switch means is in its second switch condition.

15. For retrofitting an electric circuit of an automotive vehicle that has brakes which are applied and released by an operator of the vehicle, a signaling system that includes brake switch means for giving a brake signal, a turn signal switch for giving right and left turn signals, and a hazard warning switch for giving a hazard warning signal, and an engine electronic control module that has first and second input terminals for receiving brake signals, wherein said circuit comprises;

an engine electronic control module comprising first and second inputs for receiving brake signals;

a signaling system that gives brake application, right turn, left turn, and hazard warning signals; brake switch means that serves both said electronic control module and said signaling system and that is selectively operable to give respective brake non-application and brake application signals;

a first feed from said brake switch means to said first input of said electronic control module for enabling said first input of said electronic control module to sense which one of said brake application and brake non-application signals is being given by said brake switch means;

an electromechanical relay slaved to said brake switch means to be selectively operable to first and second switch conditions corresponding respectively to said brake switch means giving a brake non-application signal and a brake application signal respectively, said relay comprising a set of contacts controlled by a coil which is selectively energized and de-energized by said brake switch means;

a second feed from said contacts of said relay to said second input of said electronic control module for enabling said second input of said electronic control module to sense to which one of said first and second switch conditions said slave switch means is being operated; and a jumper harness for connection to connector means of said combination turn signal/hazard warning signal switch after disconnection of mating connector means of a pre-existing wiring harness, said jumper harness comprising:

first and second connector means containing respective terminals, said first connector means being adapted for connection to the disconnected mating connector means of the pre-existing wiring harness and said second connector means being adapted for connection to said combination turn signal/hazard warning signal switch, plural single wire conductors each between a respective terminal of said first connector means and a corresponding terminal of said second connector means, and a further electromechanical relay having a selectively energizable coil and a set of contacts operated by said coil of said further relay, said set of contacts of said further relay being connected in circuit between a further terminal of said first connector means and a corresponding terminal of said second connector means, said coil of said further relay being connected between the further terminal of said first connector means to which said set of contacts of said further relay is connected and a ground terminal for grounding said coil of said further relay.

16. A jumper harness as set forth in claim 15 in which said first connector means comprises a single connector and said second connector means comprises a single connector.

17. A jumper harness as set forth in claim 16 in which said plural single wire conductors comprise five single wires.

* * * * *